United States Patent
Watkins et al.

(10) Patent No.: US 6,851,037 B2
(45) Date of Patent: Feb. 1, 2005

(54) METHOD OF UTILIZATION OF A DATA STORAGE ARRAY, AND ARRAY CONTROLLER THEREFOR

(75) Inventors: Mark Robert Watkins, Bristol (GB); Alastair Michael Slater, Malmesbury (GB); Andrew Michael Sparkes, Bristol (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 157 days.

(21) Appl. No.: 10/185,725

(22) Filed: Jul. 1, 2002

(65) Prior Publication Data

US 2003/0018874 A1 Jan. 23, 2003

(30) Foreign Application Priority Data

Jun. 30, 2001 (GB) .............................. 0116063

(51) Int. Cl.⁷ .............................. G06F 12/02
(52) U.S. Cl. ........................................ 711/202; 711/215
(58) Field of Search .............................. 711/202, 203, 711/215, 171

(56) References Cited

U.S. PATENT DOCUMENTS 6,327,073 B1  5/2001  Dean et al.
2002/0161983 A1 * 10/2002  Milos et al. ................ 711/202

FOREIGN PATENT DOCUMENTS

EP          0 690 385 A1    1/1996

* cited by examiner

*Primary Examiner*—Hiep T. Nguyen

(57) ABSTRACT

A number of virtual areas with virtual addresses of storage locations within the virtual areas are allocated to a data storage array, having a total physical storage capacity. Physical addresses are allocated by an array controller for the disc storage array to the virtual addresses only as data are to be written to the respective virtual addresses.

15 Claims, 4 Drawing Sheets

METHOD OF UTILIZATION OF A DATA STORAGE ARRAY, AND ARRAY CONTROLLER THEREFOR

BACKGROUND AND SUMMARY OF THE INVENTION

The invention relates to a method of using a data storage array arrangement of the kind used to store data for a number of independent end users or hosts and to a controller for such a data storage arrangement.

It is known in the prior art for companies and other organisations with computer systems, known as hosts, to out source the bulk storage of data from such systems to a storage service provider. These organisations obtain the benefit that they do not need to invest capital in large arrays of hard discs or to employ highly paid specialists to manage such arrays.

The storage service providers have large arrays of hard discs. The providers partition the total storage capacity of the hard disc arrays into a number of areas, known as Logical Units (LUNs), with a LUN being a particular disc, plurality of discs or part of a particular disc. Thus each LUN has a defined physical location within the disc array, and is in general a contiguous area of the array.

When a host rents a certain volume of storage capacity the relevant number of LUNs are assigned to that host, and the host may aggregate them into volumes. It is rare for a LUN to be used to its full capacity to store host information. However, once the size of a LUN is defined at the outset it is difficult to redefine it to a larger capacity without removal and reinsertion of all the data, so increasing the size of a LUN is generally avoided by allocating enough storage capacity at the outset to exceed predicted maximum usage requirements. Also, information technology (IT) managers tend to avoid full volumes as this can cause its own problems. The net result may be a significant amount of disc space, which is allocated to particular hosts, on one or more of the discs in the service provider's disc array remaining unused by the respective hosts and inaccessible to other hosts. Thus an expensive resource is under utilised.

Furthermore, in recent years the storage service provider business has become very competitive, with end-users expecting to pay lower and lower amounts for the same storage capacity. Hence being able to provide the service in a more cost effective manner than in the prior art would give a service provider a significant advantage.

It is an aim of the present invention to provide a method of usage of such data storage arrays which mitigates the above described problems, and an array controller for such data storage arrays.

According to a first aspect of the present invention there is provided a method of utilisation of a data storage array, having a total physical storage capacity, comprising the steps of allocating to the data storage array a number of virtual areas with virtual addresses of storage locations within the virtual areas, and allocating physical addresses to the virtual addresses only as and when data is to be written to the respective virtual addresses.

The total capacity of the virtual areas allocated to the data storage array may exceed the total physical capacity of the data storage array.

The data stored in a virtual area may be dispersed throughout the data storage array. Alternatively, the data stored in a virtual area may be dispersed around a subset of the physical capacity of the data storage array, the subset having a greater storage capacity than the virtual area.

Preferably if an attempt is made to read from a virtual address to which no data has yet been written and hence no physical address allocated a fixed data pattern is returned. The fixed data pattern may conveniently be 00000000.

The virtual areas may be Virtual Logical Units (VLUNs)

The data storage array typically comprises a plurality of discrete storage elements. The discrete storage elements may be hard discs.

According to a second aspect of the present invention, an array controller for storing data in a data storage array having a total physical storage capacity is configured such that it allocates a required capacity of storage in virtual area(s) to each host wishing to store data in the array. In response to a host exporting data for storage to which it has allocated a virtual address of a virtual area, the controller maps that virtual address to a physical address within the data storage array, and causes the data to be written to that physical address.

The total capacity of the virtual areas allocated by the array controller to a data storage array may exceed the total physical capacity of the data storage array.

Preferably the array controller is configured such that the virtual addresses of a host are mapped to physical addresses dispersed throughout the data storage array. Alternatively the array controller maps the virtual addresses of a host to physical addresses dispersed around a subset of the storage capacity of the data storage array. The subset has a greater storage capacity than the virtual area.

According to a third aspect of the present invention a data storage array includes an array controller in accordance with the second aspect of the invention.

BRIEF DESCRIPTION OF THE DRAWINGS

An embodiment of a data storage array operated in accordance with invention will now be described with reference to the accompanying drawings, in which.

DETAILED DESCRIPTION OF THE DRAWINGS

Figure 1:
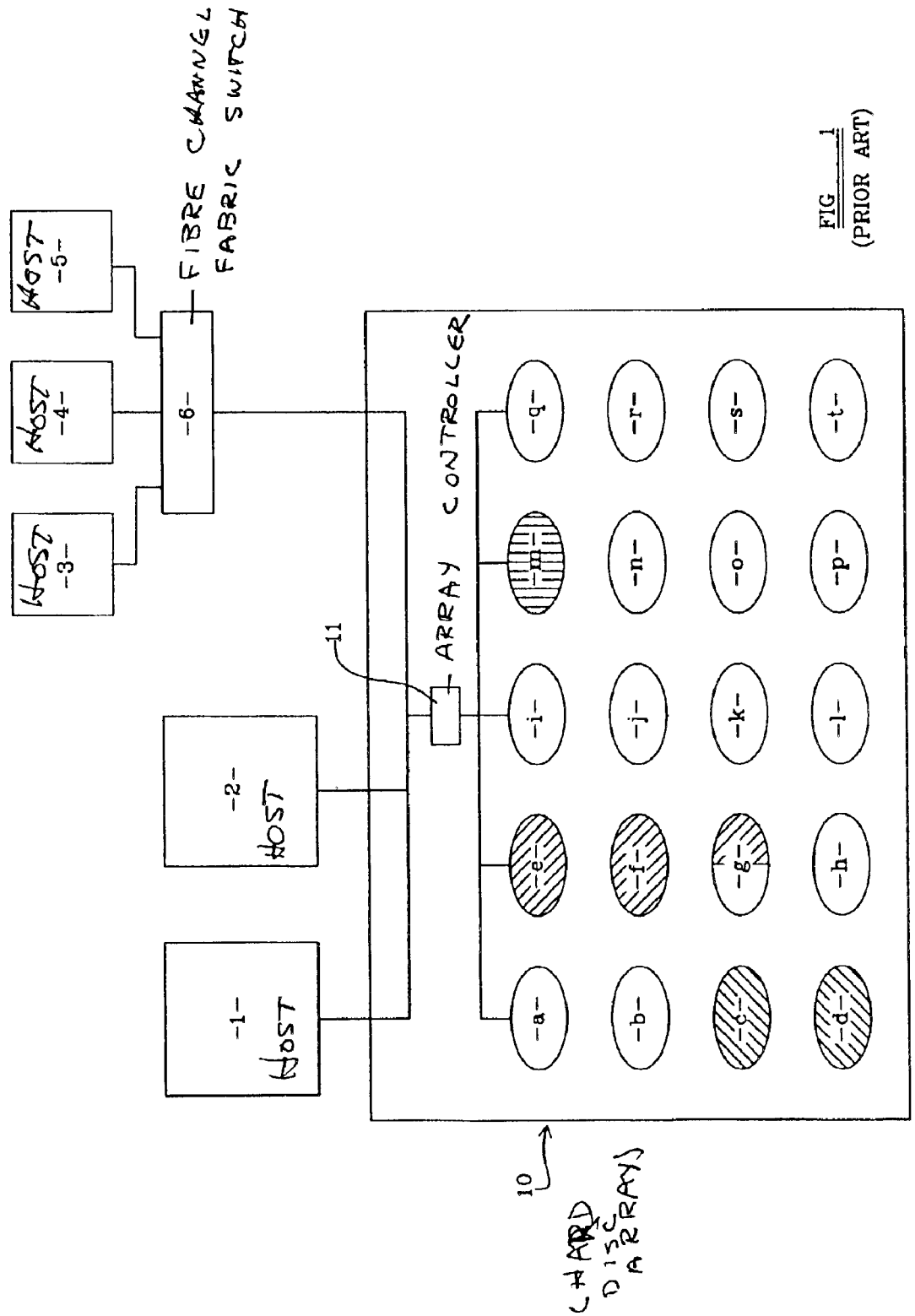
FIG. 1 is a schematic of a prior art disc array and linked hosts.

Referring first to FIG. 1, a prior art data storage array, in the form of disc array 10 is illustrated schematically. Hosts 1, 2, 3, 4 and 5 all use the array 10 for storage of their bulk data, hosts 1 and 2 via direct connection and hosts 3, 4 and 5 via a fibre channel fabric switch 6 or the like. Hard discs a to t of the disc array 10 are divided into a plurality of physical areas, in this example called Logical Units (LUNs), which have physical locations on the discs a to t. Each host has part of a LUN, a LUN or a number of LUNs allocated to it depending upon the expected maximum usage requirements of a particular host. Each host has allocated to it a physical area of the disc array 10; for example host 1 may have been allocated discs c and d (shown in a first shading), host 2 discs e, f and part of g (shown in a second shading), host 3 disc m (shown in a third shading), and so on. The physical area of the disc array 10 allocated to a host is accessed by use of the relevant physical addresses, using a simple array controller 11.

Figure 3:
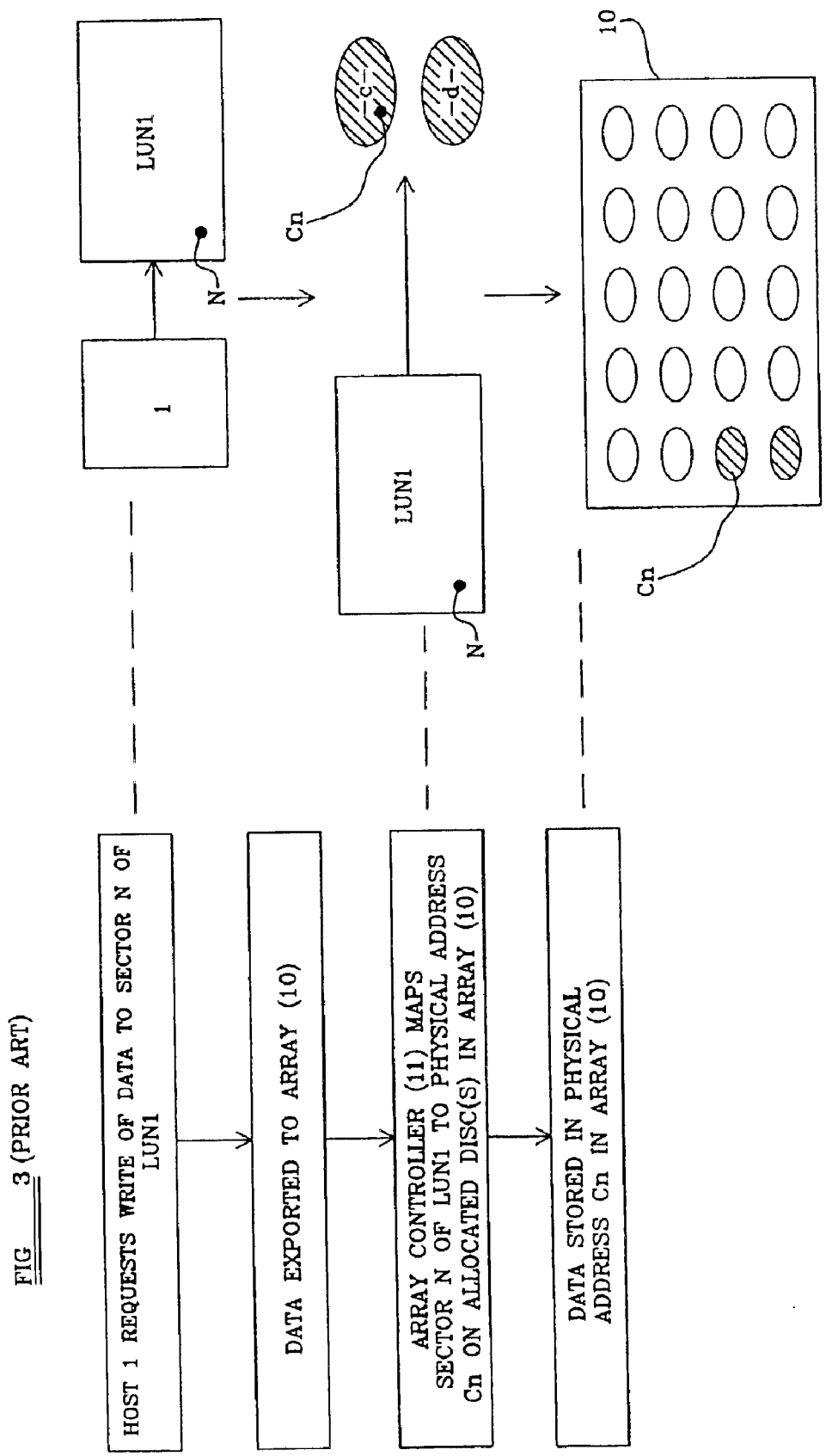
FIG. 3 is a flow chart and associated visualisation of the method of utilisation of a disc array in the prior art.

Thus in the prior art when data are written to, or read from, the disc array 10 by one of hosts 1–6 the array controller 11 performs a simple mapping operation for LUN sectors to read/write into physical addresses used within the disc array 10. An example is illustrated in FIG. 3 where Host 1 writes data to its LUN located on discs c and d of the disc array 10. Host 1 requests a write of data to sector N of its previously allocated LUN and exports the data to the disc array 10. The array controller 11 maps this to a physical address $c_n$, and writes it to disc c or d of the disc array 10 as appropriate, in this case disc c. Hence a LUN may in the prior art be considered as a contiguous array of sectors numbered 0 to n−1 (where n determines the size of the LUN).

As the hosts have the physical space allocated to them, it cannot thus be used by any other party. Typically each host will use only a fraction of its allocated space, and much of the capacity within the disc array 10 is never utilised.

Figure 2:
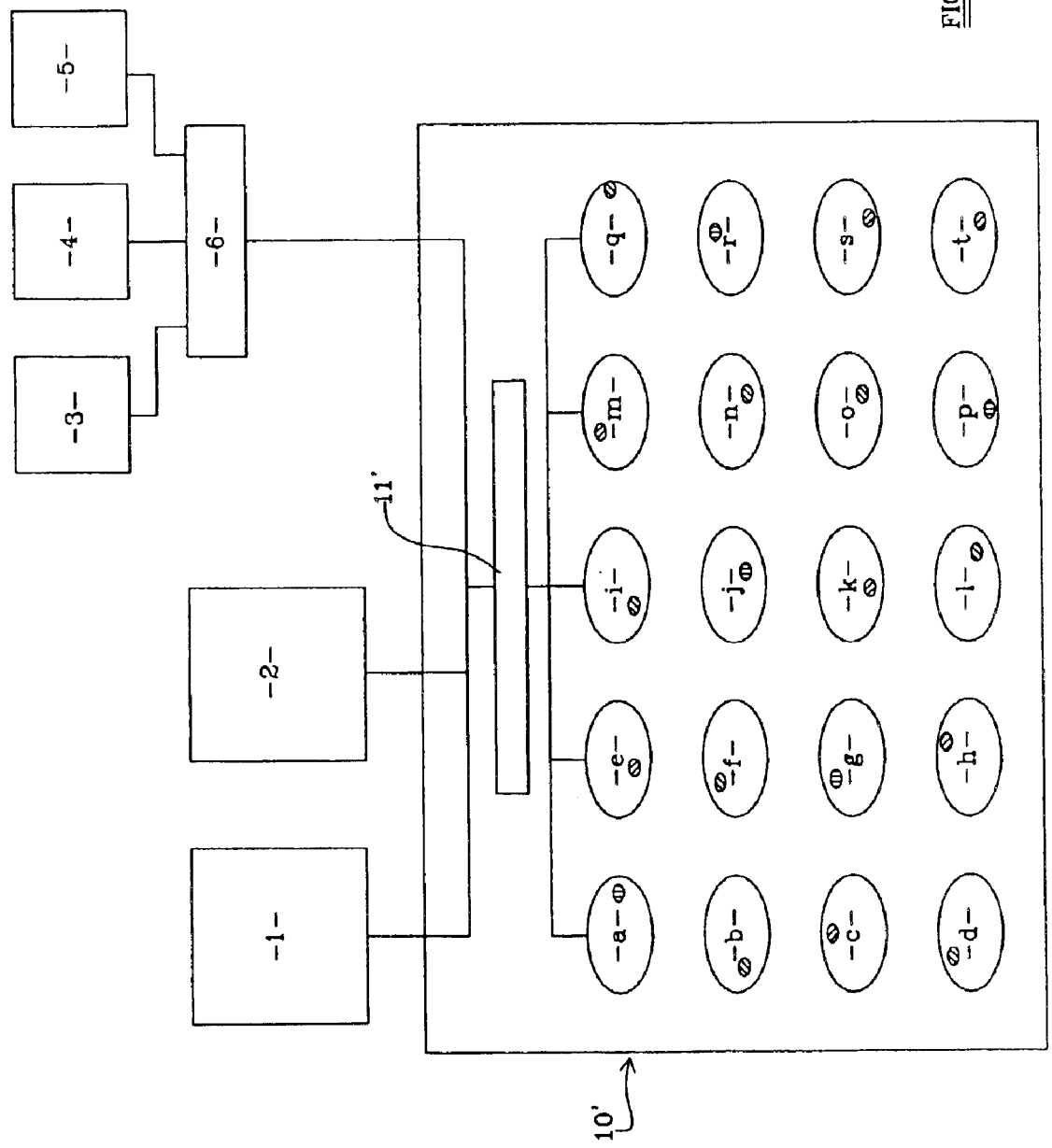
FIG. 2 is a schematic of a disc array incorporating an array controller according to the invention.
Figure 4:
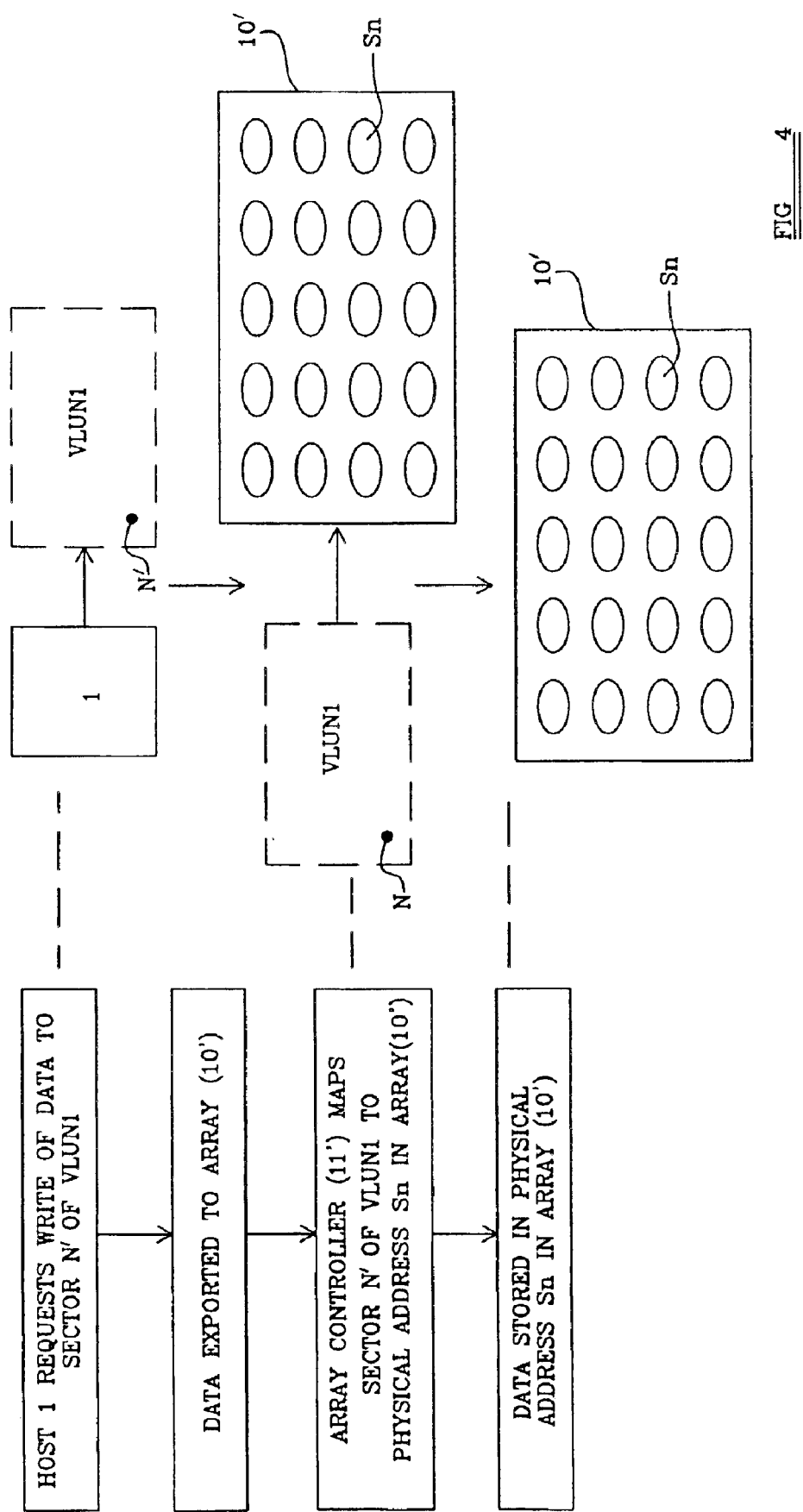
FIG. 4 is a flow chart and associated visualisation of the method of utilisation of a disc array according to the invention.

Referring now to FIGS. 2 and 4, a schematically illustrated disc array 10' includes array controller 11' which operates quite differently from that in the prior art as illustrated in FIG. 4, but in which the hard discs are as in the prior art. The physical volume of the disc array 10' is partitioned up into a number of virtual areas, hereinafter called Virtual Logical Units (VLUNs) for convenience, which are not allocated physical space on the discs a to t at that time. When a host requests a certain amount of storage capacity it is allocated the relevant storage capacity in terms of VLUNs.

When a host, e.g. host 1, wishes to store data in the disc array 10' host 1 requests a write of data to, for example, sector N' of the VLUN of host 1. Host 1 exports the data to the disc array 10', as illustrated in FIG. 4. As far as host 1 is concerned this is no different from the prior art.

The array controller 11' performs a different mapping operation from that in the prior art. Controller 11' maps only those used sectors of a VLUN into physical addresses on the discs a to t. Hence when a virtual sector of a VLUN is written to by host 1, the array controller 11' allocates a free sector from the total physical storage within the disc array 10', and allocates that physical address to the respective virtual address within the VLUN. The physical address is at that point considered used and allocated to the appropriate VLUN. In the example of FIG. 4 the sector N' of VLUN1 of host 1 is allocated to address $s_n$, which happens to be on disc s of the disc array 10', but sector N' of VLUN 1 of host 1 could have been on any other disc of the disc array 10'.

Thereafter, further read/write accesses to that same sector within the VLUN are mapped to the allocated physical sector in the disc array 10', i.e. in the example, sector N' of VLUN1 is mapped to address $S_n$ on disc s.

In response to array controller 11' receiving a request to write a sector within a VLUN that is not already mapped to a physical sector, controller 11' allocates another physical address to the relevant VLUN as described above. Controller 11' allocates VLUN addresses from 0 to n−1 in this fashion, but if a host never requests a write to certain addresses of the VLUN no physical disc array resources are consumed for those addresses.

Hence, instead of the data of host 1 being located in the disc array 10' in a contiguous physical area, as it is in the prior art disc array 10, the data of host 1 are distributed around the entire disc array 10', and interspersed with the data of other hosts. The hosts will generally notice no difference in operation from the prior art. However, the system and method of FIGS. 2 and 4 provide the advantage that a much greater proportion of the physical space within the disc array 10' can be used, indeed the physical space within the disc array 10' can be filled. Thus the expensive resource of the disc array 10' can be fully utilised by the service provider.

If the total capacity of the disc array 10' is nearly used, additional capacity can simply be provided by extending the disc array 10' or adding further such disc arrays, thus providing a new set of physical addresses to which the virtual addresses of the VLUNs can be mapped. Also, if any host does approach full usage of its VLUN capacity the allocated VLUN for that host can simply be increased in size. Hence, the system of FIG. 2 and method of FIG. 4 provide a further advantage over the prior art in that more storage space can be provided both in the disc array 10' itself, and for any particular host, without the need for data within the disc array 10' to be removed and rewritten.

At initialisation of a VLUN for a host, typically only those sectors that are used by the volume/file system manager used by that host are written, these being the sectors which hold information about the directory structure etc. Hence for most operating systems very little capacity is used at the outset, and the usage of physical space by a VLUN builds up over time. This leads to much higher usage of the available capacity within the disc array 10', as typically hosts can be allocated VLUNs with a total capacity greater than that provided by the disc array 10'. This means that the service provider can reduce its charges by comparison with the prior art.

Clearly the array controller 11' must store securely a map of the logical VLUN sectors to disc array physical addresses. It is appropriate to store such maps in a non-volatile memory and for the maps to be committed to disc media in a similar manner to that of the write data cache in the prior art. The array controller 11' may also itself be part of a pair, for fault tolerance, as is known in the prior art.

A potential problem with the use of VLUNs occurs in response to a read request being received from a host for a sector of a VLUN which has not yet been written to. If that occurs it could result in a physical address being allocated unnecessarily. The problem can be avoided by configuring the array controller 11' so it automatically returns to a fixed data pattern, such as 00000000, in such circumstances.

An additional advantage which can be obtained from the use of VLUNs is a faster retrieval of data by the hosts. If a host's data are deliberately spread widely around the discs a to t of the disc array 10' then, as all disc spindles search for data when that host makes a request, the search data are likely to be found more quickly on many occasions than would have been the case of all the data being on one or two discs, as in the prior art, and hence only one or two disc spindles searching.

However, if required by a particular host, the VLUN of that host can be restricted to being mapped onto a subset of discs a to t within the disc array 10'. For example hosts 3, 4 and 5 which are part of a network of related hosts may be prepared to share a subset of the capacity of the disc array, e.g. a number of discs, between themselves, but not to have their data mixed with that of other hosts. Thus the subset of the capacity within the disc array 10' available to those hosts is of greater capacity than the VLUN of any one of those hosts. Related hosts obtain the benefits of the invention but to a lesser degree than might be the case if the related hosts were prepared to have their data distributed more widely. The array controller 11 can be configured to deal with such requirements.

The invention is described above in connection with a disc array 10 comprising discrete storage elements in the form of hard discs. It is however equally applicable for use with other forms of data storage arrays employing alternative storage media, for examples: optical storage or solid state storage such a magnetic RAM (MRAM).

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

We claim:

1. A hard disk array comprising:

a plurality of hard disks including plural virtual logic units, the hard disk array having a total physical storage capacity; and an array controller for controlling storage capacity of data in the hard disk array, the array controller being configured for (a) allocating a required capacity of storage in virtual area(s) to each host wishing to store data in the array, and (b) writing the data to a physical address in response to a host exporting data for storage to which it has allocated a virtual address of a virtual area maps that virtual address to the physical address within the data storage array.

2. An array controller according to claim 1 wherein the total capacity of the virtual areas allocated to a data storage array exceeds the total physical capacity of the data storage array.

3. An array controller according to claim 1 wherein the array controller is configured for causing the virtual addresses of a host to be mapped to physical addresses dispersed throughout the data storage array.

4. An array controller according to claim 1 wherein the array controller is configured for causing the virtual addresses of a host to be mapped to physical addresses dispersed around a subset of the total storage capacity of the data storage array, the subset being of greater storage capacity than the virtual area(s) allocated to that host.

5. The hard disk array of claim 1 wherein the array controller is arranged for (a) attempting to read from a virtual address to which no data has yet been written, (b) returning to a virtual address having a fixed data pattern in response to the attempt being unsuccessful, and (c) accessing the physical address corresponding to the virtual address having the fixed data pattern.

6. A method of using a data storage array having a total physical storage capacity, the method comprising:

allocating to the data storage array a number of virtual areas with virtual addresses of storage locations within the virtual areas;

allocating physical addresses to the virtual addresses only as data are to be written to the respective virtual addresses;

attempting to read from a virtual address to which no data has yet been written;

returning to a virtual address having a fixed data pattern in response to the attempt being unsuccessful; and accessing the physical address corresponding to the virtual address having the fixed data pattern.

7. A method according to claim 6 wherein the total capacity of the virtual areas allocated to the data storage array exceeds the total physical storage capacity of the data storage array.

8. A method according to claim 6 wherein the physical addresses are allocated so data stored in a virtual area are dispersed throughout the physical addresses of the data storage array.

9. A method according to claim 6 wherein the physical addresses are allocated so data stored in a virtual area are dispersed around a subset of the physical addresses of the data storage array, the subset having a greater storage capacity than the virtual area.

10. A method according to claim 6 wherein the fixed data pattern is 00000000.

11. A method according to claim 6 wherein the virtual areas are Virtual Logical Units (VLUNs).

12. A method according to claim 6 wherein the data storage array comprises a plurality of discrete storage elements.

13. A method according to claim 12 wherein the discrete storage elements are hard discs.

14. An array controller for controlling storage of data in a data storage array, the data storage array having a total physical storage capacity, wherein the array controller is configured for (a) allocating a required capacity of storage in virtual area(s) to each host wishing to store data in the array, (b) writing the data to a physical address in response to a host exporting data for storage to which it has allocated a virtual address of a virtual area maps that virtual address to the physical address within the data storage array, and (c) attempting to read from a virtual address to which no data has yet been written.

15. A hard disk array comprising:

a plurality of hard disks including plural virtual logic units, the hard disk array having a total physical storage capacity; and a controller included in the array for allocating to the hard disk array (a) a number of virtual areas with virtual addresses of storage locations within the virtual areas, and (b) physical addresses to the virtual addresses only as data are to be written to the respective virtual addresses.

* * * * *